United States Patent
Yamamoto

(10) Patent No.: US 7,718,947 B2
(45) Date of Patent: May 18, 2010

(54) IMAGING APPARATUS WITH TILTING DEVICE FOR SHIFTING AN OBJECT FIELD

(75) Inventor: Harushige Yamamoto, Yamato (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 11/471,189

(22) Filed: Jun. 20, 2006

(65) Prior Publication Data

US 2006/0284055 A1    Dec. 21, 2006

(30) Foreign Application Priority Data

Jun. 20, 2005    (JP)    ............................. 2005-179830

(51) Int. Cl.
*H01J 3/14*    (2006.01)
*H01J 5/16*    (2006.01)
(52) U.S. Cl. ................. 250/216; 250/208.1; 359/211.3; 359/402
(58) Field of Classification Search ............. 250/208.1, 250/559.3, 214 VT, 216; 359/211, 212, 402, 359/409, 556, 211.3, 211.2; 396/93, 133; 348/335, 336, 343, 344
See application file for complete search history.

(56) References Cited

U.S. PATENT DOCUMENTS

| | | | | |
|---|---|---|---|---|
| 4,172,524 A | * | 10/1979 | Holm et al. ................. | 209/524 |
| 5,469,236 A | * | 11/1995 | Roessel ....................... | 396/432 |
| 5,523,887 A | * | 6/1996 | Wight ......................... | 359/556 |
| 2006/0285232 A1 | * | 12/2006 | Hayashi ...................... | 359/811 |

FOREIGN PATENT DOCUMENTS

| CN | 2392323 Y | 8/2000 |
|---|---|---|
| JP | 7-104335 A | 4/1995 |

OTHER PUBLICATIONS

Second Office Action issued in corresponding Chinese application No. 200610086739.4, dated Mar. 27, 2009 issued in.

* cited by examiner

*Primary Examiner*—Thanh X Luu
*Assistant Examiner*—Francis M Legasse, Jr.
(74) *Attorney, Agent, or Firm*—Rossi, Kimms & McDowell LLP

(57) ABSTRACT

An imaging apparatus which can be reduced in size and secure a sufficient tilt angle. In the imaging apparatus, light is incident along a first optical axis on a first prism that is rotated by a tilting mechanism about a second optical axis, and is bent by the first prism in a direction of the second optical axis. Then, the light is incident along the second optical axis on a second prism disposed coaxially with the second optical axis, is bent by the second prism in a direction of a third optical axis, and passes through a photographic lens system disposed coaxially with the third optical axis. The light is received by an image pickup element from which an image signal is output.

14 Claims, 6 Drawing Sheets

IMAGING APPARATUS WITH TILTING DEVICE FOR SHIFTING AN OBJECT FIELD

BACKGROUND OF THE INVENTION

1. Field of the Invention

The present invention relates to an imaging apparatus which is capable of performing a tilting operation for shifting an object field of the imaging apparatus in a tilting direction, and a tilting device incorporated in the imaging apparatus.

2. Description of the Related Art

There has been proposed an automatic object follow-up device which is capable of automatically following up an object in panning and tilting directions or automatically following up an object according to an output of a sensor that detects a camera shake (see e.g. Japanese Laid-Open Patent Publication (Kokai) No. H07-104335). This automatic object follow-up device is comprised of a lens barrel assembly integrally incorporating a lens barrel that holds a lens group and an image pickup element that picks up an object image formed thereon through the lens group, and a mirror-rotating means for tilting a reflective surface of a mirror directed toward the object, at a location forward of the lens group, to thereby vary the tilt angle of the reflective surface of the mirror. In this automatic object follow-up device, by varying the tilt angle of the reflective surface of the mirror, the object image is turned toward the lens group via the reflective surface of the mirror, and at the same time the lens barrel assembly is rotated about the optical axis of the lens barrel, in unison with the mirror.

However, with the arrangement of the above described automatic object follow-up device, the mirror for performing a tilting operation is provided forward of the lens group of the lens barrel assembly in a tilted manner, and hence this causes an increase in the size of the device. Further, when an upward or downward tilting operation is performed through a large tilt angle relative to a horizontal direction, i.e. when the reflective surface of the mirror is tilted through a large angle, the object field of the image pickup element can be obstructed by the lens barrel assembly, and hence it is difficult to secure a sufficient tilt angle, that is, a tilting operation-allowable range is limited.

SUMMARY OF THE INVENTION

It is an object of the present invention to provide an imaging apparatus and a tilting device which make it possible to attain reduction of the size thereof and at the same time secure a sufficient tilt angle.

To attain the above object, in a first aspect of the present invention, there is provided an imaging apparatus comprising a first optical member that has a first optical axis and bends light incident thereon along the first optical axis, in a direction of a second optical axis different from the first optical axis, a second optical member that is disposed coaxially with the second optical axis and bends the light incident thereon along the second optical axis, in a direction of a third optical axis different from the second optical axis, a rotating device that rotates the first optical member about the second optical axis, an imaging lens system that is disposed coaxially with the third optical axis, for passing the light bent by the second optical member therethrough, and an image pickup element that receives the light having passed through the imaging lens system and outputs an image signal.

With the arrangement of the imaging apparatus according to the first aspect of the present invention, an upward or downward tilting operation is performed by rotating the first optical member about the second optical axis. Therefore, it is possible to set the tilting operation allowable range to an angle of $2\pi$ (rad) about the second optical axis, whereby it is possible to not only attain reduction of the size of the apparatus, but also secure a sufficient tilt angle.

Preferably, the imaging apparatus comprises a base plate that holds the second optical member, and the first optical member is supported on the base plate in a manner rotatable about the second optical axis.

Preferably, at least one of the first optical member and the second optical member is formed by an optical prism.

Preferably, at least one of the first optical member and the second optical member is formed by an optical reflective mirror.

To attain the above object, in a second aspect of the present invention, there is provided a tilting device incorporated in an imaging apparatus including an imaging lens system, comprising a first optical member that has a first optical axis and bends light incident thereon along the first optical axis, in a direction of a second optical axis different from the first optical axis, a second optical member that is disposed coaxially with the second optical axis and bends the light incident along the second optical axis, in a direction of a third optical axis different from the second optical axis, and a rotating device that rotates the first optical member about the second optical axis.

With the arrangement of the tilting device according to the second aspect of the present invention, it is possible to provide the same advantageous effects as provided by the imaging apparatus according to the first aspect of the present invention.

The above and other objects, features, and advantages of the present invention will become more apparent from the following detailed description taken in conjunction with the accompanying with drawings.

DETAILED DESCRIPTION OF THE PREFERRED EMBODIMENTS

The present invention will now be described in detail below with reference to the drawings showing preferred embodiments thereof.

Figure 1:
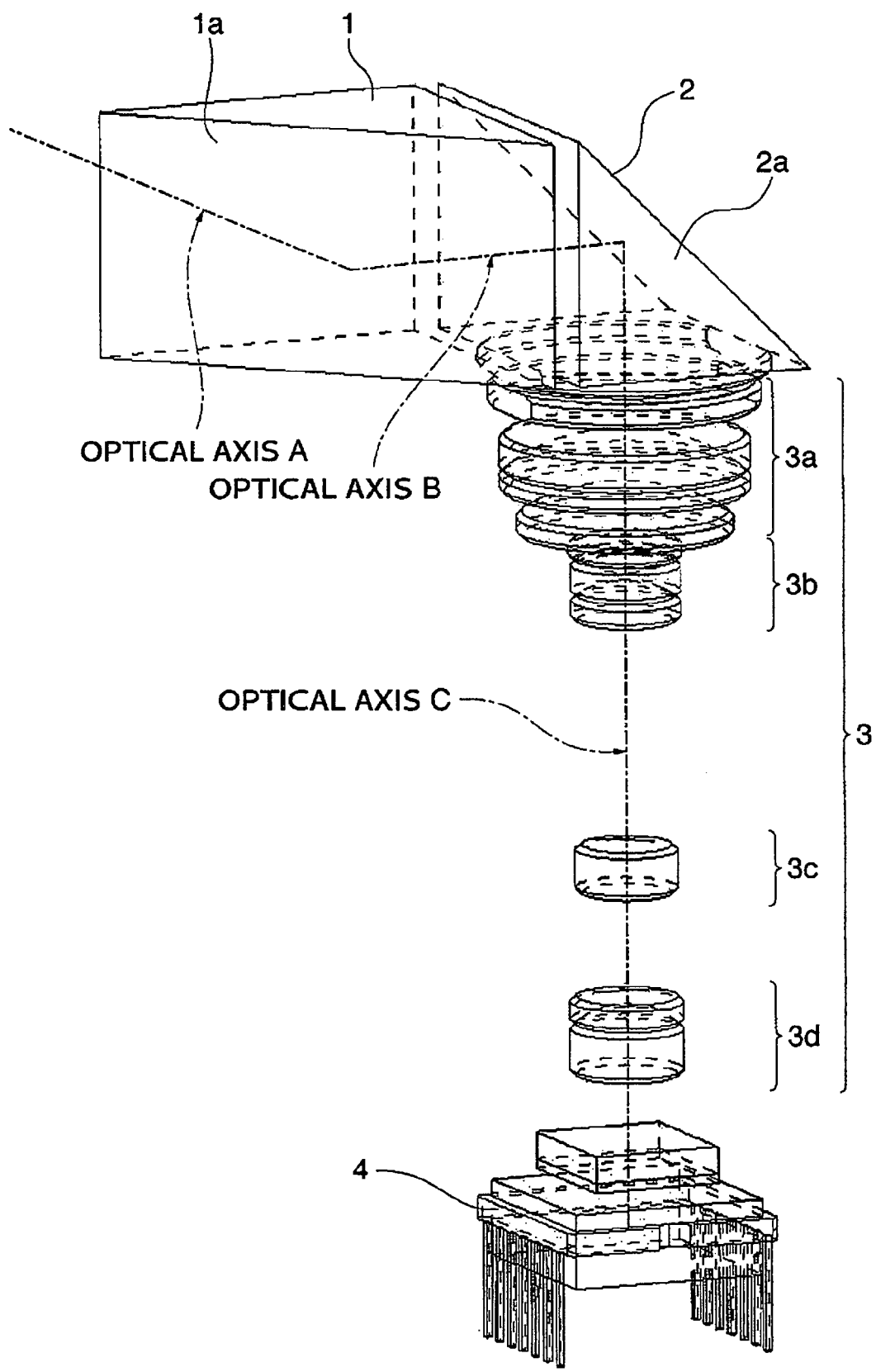
FIG. 1 is an exploded perspective view of essential parts of a photographic optical system of an imaging apparatus according to a first embodiment of the present embodiment.

FIG. 1 is an exploded perspective view of essential parts of a photographic optical system of an imaging apparatus according to a first embodiment of the present embodiment.

The imaging apparatus, such as a video camera, is provided with the photographic optical system shown in FIG. 1. The photographic optical system includes first and second prisms 1 and 2 as optical members. The first prism 1 has an optical axis A (first optical axis). The first prism 1 is formed with a reflective surface 1a that reflects photographic light from an object, which is made incident along the optical axis A thereon from an incidence surface of the first prism 1, in a direction of an optical axis B (second optical axis) different from the optical axis A. The light having entered the first prism 1 through the incidence surface of the first prism 1 is reflected from the reflective surface 1a to be emitted from an emitting surface of the first prism 1 in the direction of the optical axis B. The optical axis A and the optical axis B are perpendicular to each other.

The second prism 2 is disposed coaxially with the optical axis B at a location rearward of the first prism 1 such that an incidence surface thereof is opposed to the emitting surface of the first prism 1. The second prism 2 is formed with a reflective surface 2a that reflects (bends) light incident thereon along the optical axis B, in a direction of an optical axis C (third optical axis) different from the optical axis B. The light reflected from the reflective surface 2a of the second prism 2 is emitted from an emitting surface of the same in the direction of the optical axis C. In short, the light emitted from the emitting surface of the first prism 1 enters the second prism 2 through the incidence surface of the second prism 2, and is reflected (bent) on the reflective surface 2a in the direction of the optical axis C and emitted from the emitting surface of the second prism 2. The optical axis B and the optical axis C are perpendicular to each other.

The light emitted from the second prism 2 in the direction of the optical axis C travels toward a photographic lens system 3 disposed coaxially with the optical axis C. The photographic lens system 3 is comprised of a fixed lens group 3a, a variable power lens group 3b, a lens group 3c fixed together with a diaphragm, not shown, and a focus lens group 3d. Focusing, diaphragm, and zooming functions are realized by these lens groups. The light having passed through the photographic lens system 3 forms an object image on an image forming surface of an imaging element 4 implemented e.g. by a CCD.

The photographic optical system is capable of performing a tilting operation for shifting the object field upward or downward. The tilting operation is performed by rotating the first prism 1 about the optical axis B using a tilting mechanism, details of which will be described hereinafter.

Next, the imaging apparatus incorporating the photographic optical system and the tilting mechanism will be described with reference to FIGS. 2 and 3.

Figure 2:
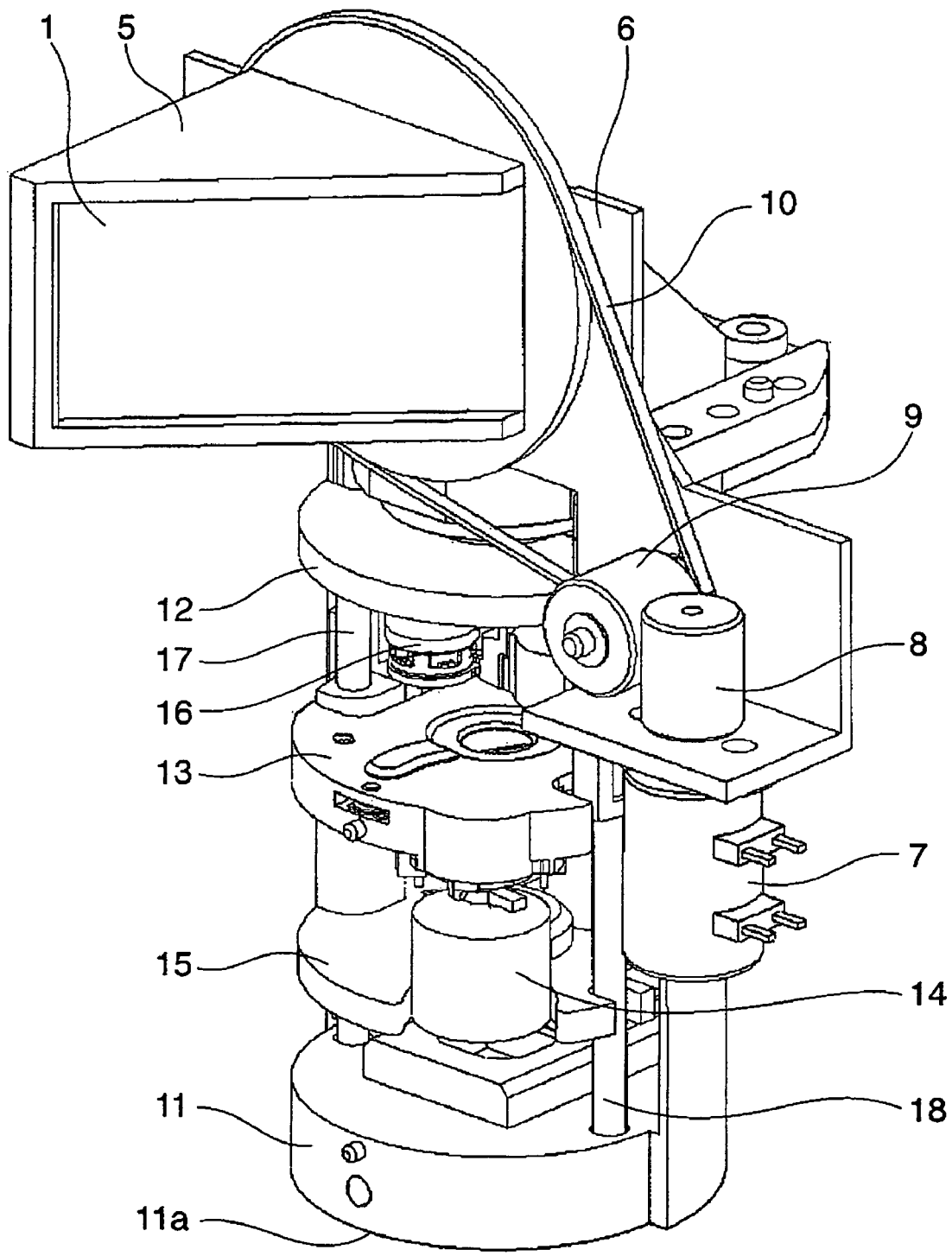
FIG. 2 is a perspective view of the appearance of essential parts of the imaging apparatus incorporating the photographic optical system in FIG. 1 and a tilting mechanism for the photographic optical system.
Figure 3:
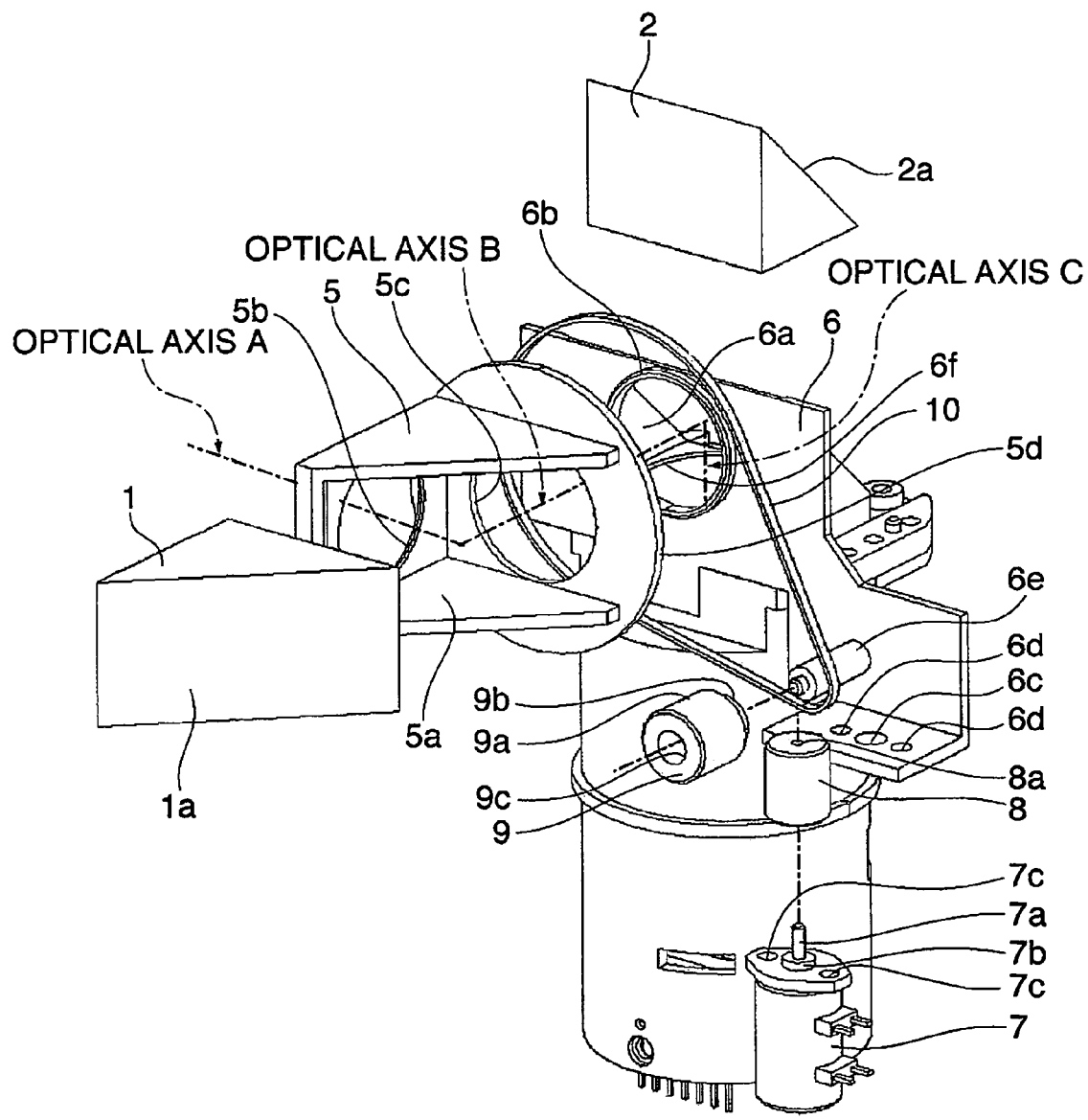
FIG. 3 is an exploded perspective view of the essential parts of the imaging apparatus incorporating the photographic optical system in FIG. 1 and the tilting mechanism for the photographic optical system.

FIG. 2 is a perspective view of the appearance of essential parts of the imaging apparatus incorporating the photographic optical system in FIG. 1 and the tilting mechanism for the photographic optical system, and FIG. 3 is an exploded perspective view of the essential parts of the imaging apparatus.

In the imaging apparatus, the first prism 1 is held by a prism-holding member 5 as shown in FIGS. 2 and 3. As shown in FIG. 3, the prism-holding member 5 includes a holding part 5a for holding the first prism 1. Further, the prism-holding member 5 is formed with openings 5b and 5c. The opening 5b is disposed coaxially with the optical axis A of the first prism 1, for allowing light from an object to enter the incidence surface of the first prism 1 along the optical axis A. The opening 5c is disposed coaxially with the optical axis B, for passing therethrough the light reflected from the reflective surface 1a of the first prism 1 and emitted along the optical axis B perpendicular to the optical axis A. Further, the prism-holding member 5 includes a pulley part 5d having a toothed outer periphery. The pulley part 5d is disposed coaxially with the opening 5c and the optical axis B.

The second prism 2 is held by a prism base plate 6. The prism base plate 6 is formed with an opening 6a for receiving light from the first prism 1. The opening 6a is disposed coaxially with the optical axis B in a manner opposed to the opening 5c of the prism-holding member 5. Further, the prism base plate 6 is formed with an annular projection 6b which is engaged in the opening 5c of the prism-holding member 5 in a manner slidable relative to the same. The projection 6b is disposed coaxially with the opening 6a. The prism-holding member 5 is rotatably supported on the prism base plate 6 by the slidable engagement between the projection 6b and the opening 5c. Further, the prism base plate 6 is formed with an opening 6f, for allowing light to travel into the photographic lens system 3. The opening 6f is disposed coaxially with the optical axis C, for passing therethrough the light reflected from the reflective surface 2a of the second prism 2 and emitted along the optical axis C perpendicular to the optical axis B. Furthermore, the prism base plate 6 is formed with an engagement part 6c, two screw holes 6d, and a shaft 6e. The aforementioned fixed lens group 3a (see FIG. 1) is held by the prism base plate 6.

A tilt drive motor 7 is mounted to the prism base plate 6. The tilt drive motor 7 has an output shaft 7a, a bearing metal 7b for the output shaft 7a, and two female threads 7c. The bearing metal 7b has an outer peripheral part thereof fitted in the engagement part 6c of the prism base plate 6. Screws, not shown, inserted through the respective screw holes 6d of the prism base plate 6 are screwed into the female threads 7c, respectively, whereby the tilt drive motor 7 is secured to the prism base plate 6. The output shaft 7a of the tilt drive motor 7 is rigidly fitted in a central hole 8a of a worm gear 8. The worm gear 8 is configured to mesh with a helical gear 9. The helical gear 9 is formed with a fitting hole 9c for being rotatably fitted on the shaft 6e of the prism base plate 6. Further, the helical gear 9 also includes a helical gear part 9a and a toothed pulley part 9b for engagement with a timing belt 10.

The timing belt 10 is engaged not only with the toothed pulley part 9b of the helical gear 9 but also with the toothed pulley part 5d of the prism-holding member 5. Thus, the rotation of the tilt drive motor 7 is transmitted to the timing belt 10 via the worm gear 8 and the helical gear 9, and the pulley part 5d of the prism-holding member 5 is rotated with rotation of the timing belt 10. As the pulley part 5d rotates, the first prism 1 is rotated about the optical axis B, and an angle of the optical axis A of the first prism 1 relative to the optical axis C is changed. In short, a tilting operation for moving the object field upward or downward (i.e. in a tilting direction) is performed.

Further, in the present imaging apparatus, the aforementioned variable power lens group 3b (see FIG. 1) is held by a holding member 12 shown in FIG. 2. The holding member 12 is supported by two guide bars 17 and 18 fixed to a mirror frame 11, in a manner slidable in the direction of the optical axis (optical axis C). The holding member 12 is driven by a stepper motor, not shown, to advance and recede along the optical axis while being guided by the guide bars 17 and 18. A zooming operation for changing the photographing magnification is performed by the vertical motion of the holding member 12 along the optical axis.

The lens group 3c (see FIG. 1) and the diaphragm for controlling the amount of photographic light coming from an object and passing through the diaphragm are provided in a diaphragm unit 13, and the diaphragm unit 13 is secured to the mirror frame 11. The diaphragm is driven by a diaphragm drive motor 14. The image pickup element 4 (see FIG. 1) is held on a rear end 11a of the mirror frame 11.

The focus lens group 3d (see FIG. 1) is held by a holding member 15. The holding member 15 is supported by the two guide bars 17 and 18 in a manner slidable along the optical axis (optical axis C). The holding member 15 is driven by a stepper motor 16 to advance and retract along the optical axis while being guided by the guide bars 17 and 18. A focusing operation for focusing an object is performed by the advancing and retracting motions of the holding member 15 along the optical axis.

Figure 4:
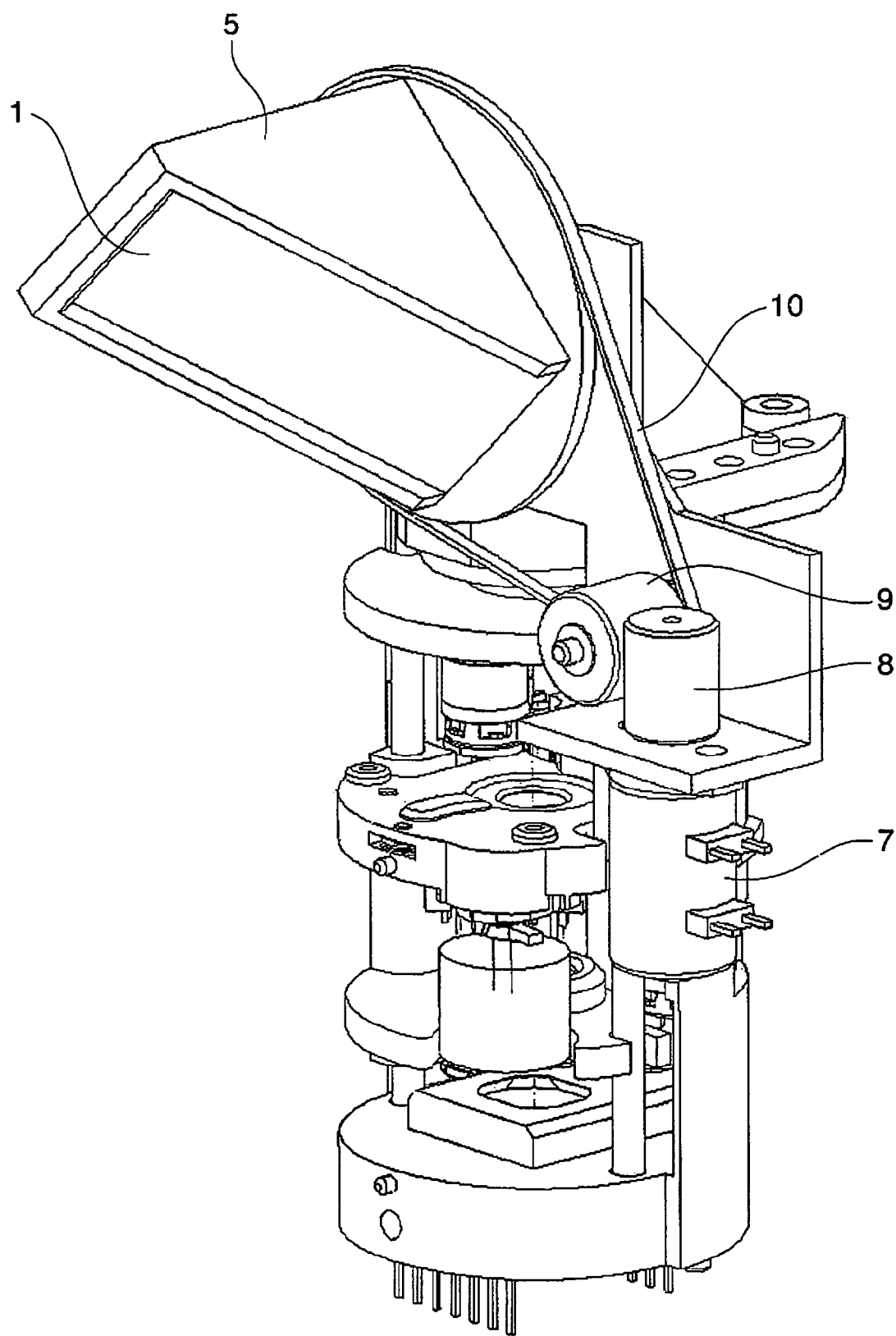
FIG. 4 is a perspective view of an upwardly tilted state of the photographic optical system of the imaging apparatus in FIG. 2.

Next, the tilting operation of the photographic optical system of the present imaging apparatus will be described with reference to FIGS. 4 and 5. FIG. 4 is a perspective view of an upwardly tilted state of the photographic optical system of the imaging apparatus in FIG. 2, and FIG. 5 is a perspective view of a downwardly tilted state of the same.

Here, the imaging apparatus is installed such that the optical axis of the photographic lens system 3, i.e. the optical axis C extends vertically. Further, an initial tilted state of the imaging apparatus is set such that the optical axis A of the first prism 1 extends horizontally.

In this installed state, to tilt the photographic optical system, for example, upward through a tilt angle of θ from the initial tilted state, the tilt drive motor 7 is driven in a direction corresponding to the tilting direction such that it performs a number of rotations corresponding to the tilt angle of θ, as shown in FIG. 4. The rotation of the tilt drive motor 7 is transmitted to the pulley part 5d of the prism-holding member 5 via the worm gear 8, the helical gear 9, and the timing belt 10, whereby the prism-holding member 5 is rotated about the optical axis B (see FIG. 3) through the tilt angle of θ in a clockwise direction, as viewed in FIG. 4. As a consequence, the opening 5b (see FIG. 3) of the prism-holding member 5 is directed obliquely upward. More specifically, the first prism 1 (optical axis A) is tilted upward from the horizontal direction through the tilt angle of θ, whereby the object field is shifted obliquely upward. At this time, when the first prism 1 is tilted through the tilt angle of θ, an object image reflected twice by the first and second prisms 1, 2 and then formed on the image pickup element 4 is rotated through an angle equal to the tilt angle of θ relative to a reference object image to be formed when the first prism 1 is in the horizontal position. To cope with the rotation of the object image, the object image formed on the image pickup element 4 is tilted through the angle of θ, for correction, e.g. based on an output signal from a tilt angle-detecting sensor, not shown, to be output to an external liquid crystal monitor or recorded in an image memory, whereby a desired tilted image can be obtained.

Figure 5:
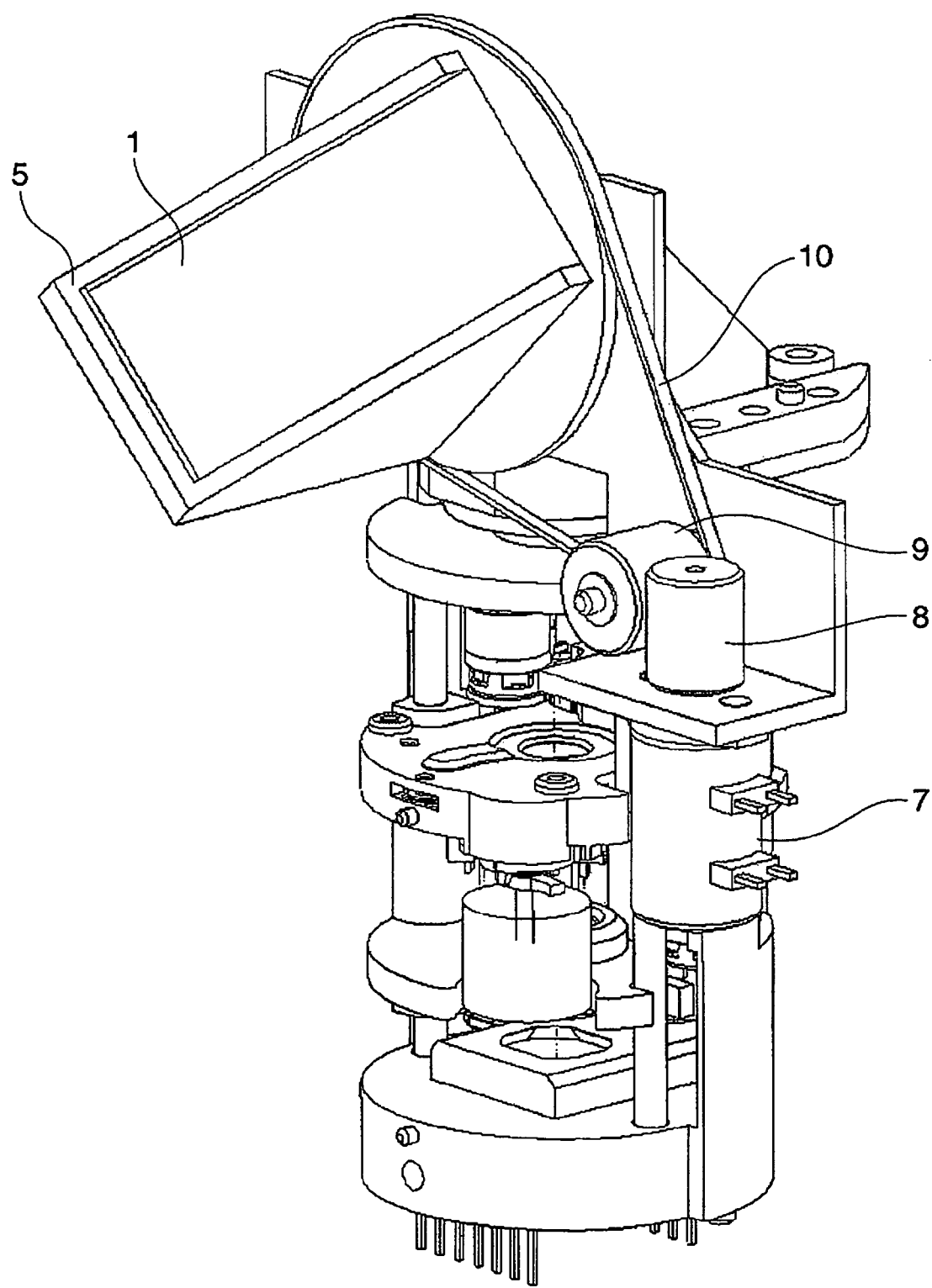
FIG. 5 is a perspective view of a downwardly tilted state of the photographic optical system of the imaging apparatus in FIG. 2.

On the other hand, to tilt the photographic optical system downward through a tilt angle of θ from the initial tilted state, the tilt drive motor 7 is driven to rotate in a direction corresponding to the tilting direction such that it performs a number of rotations corresponding to the tilt angle of θ, as shown in FIG. 5. The rotation of the tilt drive motor 7 is transmitted to the pulley part 5d of the prism-holding member 5 via the worm gear 8, the helical gear 9, and the timing belt 10, whereby the prism-holding member 5 is rotated about the optical axis B through the tilt angle of θ in a counterclockwise direction, as viewed in FIG. 5. As a consequence, the first prism 1 is tilted downward from the horizontal direction through the tilt angle of θ, whereby the object field is shifted obliquely downward.

According to the present embodiment, the upward or downward tilting operation is performed by angularly rotating the first prism 1 about the optical axis B. This configuration makes it possible to set a tilting operation allowable range to an angle of 2π (rad) about the optical axis B, to thereby secure a sufficient tilt angle. Further, since the tilting operation is performed by rotating the first prism 1 about the optical axis B, it is possible to attain reduction of the size of the imaging apparatus.

Figure 6:
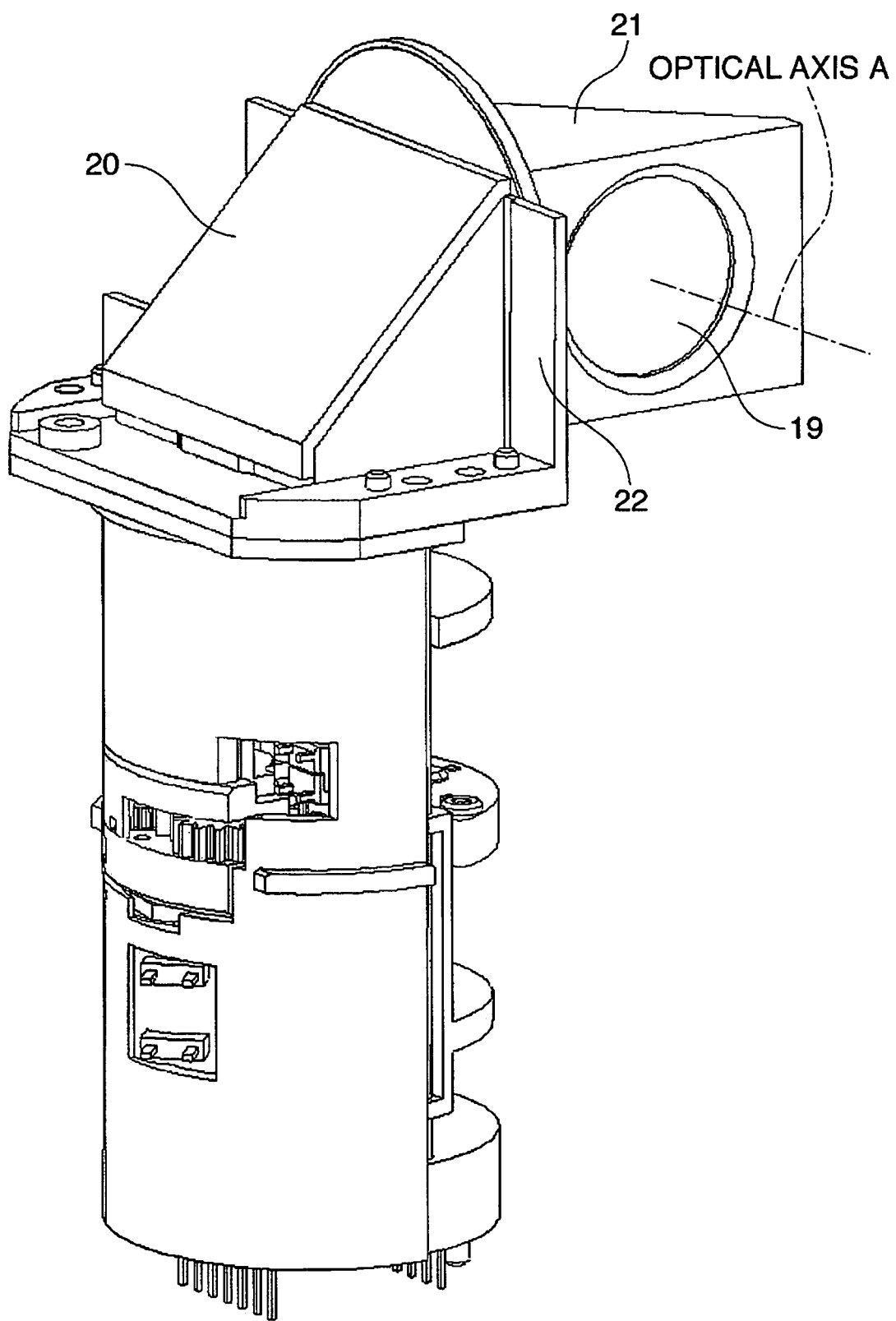
FIG. 6 is a perspective view of the appearance of essential parts of an imaging apparatus according to a second embodiment of the present invention.

Next, a second embodiment of the present invention will be described with reference to FIG. 6. FIG. 6 is a perspective view of the appearance of essential parts of an imaging apparatus according to the second embodiment.

The imaging apparatus according to the present embodiment is distinguished from the imaging apparatus according to the first embodiment in that reflective mirrors are used as optical members in place of the first prism 1 and the second prism 2. The other parts are identical in configuration to the corresponding parts of the first embodiment, and therefore description thereof is omitted.

More specifically, as shown in FIG. 6, the imaging apparatus according to the present embodiment has a reflective mirror-holding member 21 and a reflective mirror base plate 22. The reflective mirror-holding member 21 is identical in shape to the prism-holding member 5 of the first embodiment, and a first reflective mirror 19 is held in a predetermined position in the reflective mirror-holding member 21. Similarly to the first prism 1, the first reflective mirror 19 reflects light incident thereon along the optical axis A, in the direction of the optical axis B, not shown in FIG. 6, perpendicular to the optical axis A. The predetermined position of the first reflective mirror 19 in the reflective mirror-holding member 21 corresponds to that of the reflective surface 1a of the first prism 1 in the prism-holding member 5 of the first embodiment. The first reflective mirror 19 is formed by a resin plate member having a reflective film vapor-deposited on one surface thereof. Alternatively, a plate member having a reflective mirror laminated thereon can also be used as the first reflective mirror 19.

The reflective mirror base plate 22 is identical in shape to the prism base plate 6 of the first embodiment. A second reflective mirror 20 is held in a predetermined position on the reflective mirror base plate 22. The second reflective mirror 20 reflects the light reflected from the first reflective mirror 19 and traveling along the optical axis B, in the direction of the optical axis C, not shown in FIG. 6, perpendicular to the optical axis B. The predetermined position of the second reflective mirror 20 on the reflective mirror base plate 22 corresponds to that of the reflective surface 2a of the second prism 2 on the prism base plate 6 of the first embodiment. Similarly to the first reflective mirror 19, the second reflective mirror 20 is formed by a resin plate member having a reflective film vapor-deposited on one surface thereof. Alternatively, a plate member having a reflective mirror laminated thereon can also be used as the second reflective mirror 20.

The present invention is not limited to the above described embodiment, but can be modified in various manners based on the subject matter of the present invention, which should not be excluded from within the scope of the present invention insofar as functions as recited in the appended claims or the functions performed by the construction of the above described embodiment can be achieved.

This application claims the benefit of Japanese Application No. 2005-179830, filed Jun. 20, 2006, which is hereby incorporated by reference herein in its entirety.

What is claimed is:

1. An imaging apparatus comprising:
   a first optical member that has a first optical axis and bends light incident thereon along the first optical axis, in a direction of a second optical axis different from the first optical axis;
   a second optical member that is disposed coaxially with the second optical axis and bends the light incident thereon along the second optical axis, in a direction of a third optical axis different from the second optical axis;
   a plurality of lenses, at least one of which is a focus lens, wherein all of the lenses of the imaging apparatus are disposed coaxially with the third optical axis, the plurality of lenses being guided in the direction of the third optical axis by a guide bar parallel to the third optical axis;
   a rotating device that rotates said first optical member about the second optical axis, the rotating device being driven by a motor of which a rotation axis thereof is parallel with the third optical axis; and
   an image pickup element that receives the light having passed through said plurality of lenses and outputs an image signal, the image pickup element being fixed regardless of the rotation of said first optical member.

2. An imaging apparatus as claimed in claim 1, comprising a base plate that holds said second optical member, and wherein said first optical member is supported on said base plate in a manner rotatable about the second optical axis.

3. An imaging apparatus as claimed in claim 1, wherein at least one of said first optical member and said second optical member is formed by an optical prism.

4. An imaging apparatus as claimed in claim 1, wherein at least one of said first optical member and said second optical member is formed by an optical reflective mirror.

5. An imaging apparatus as claimed in claim 1, further comprising a correction device that is adapted to correct the image signal output by said image pickup element which is rotated by an angle of θ when said first optical member is rotated by the angle of θ so as to obtain a desired rotated image.

6. A tilting device incorporated in an imaging apparatus having an image pickup element, comprising:
   a first optical member that has a first optical axis and bends light incident thereon along the first optical axis, in a direction of a second optical axis different from the first optical axis;
   a second optical member that is disposed coaxially with the second optical axis and bends the light incident thereon along the second optical axis, in a direction of a third optical axis different from the second optical axis;
   a plurality of lenses, including at least one focus lens, wherein all of the lenses of the imaging apparatus are disposed entirely coaxially with the third optical axis, the plurality of lenses being guided in the direction of the third optical axis by a guide bar parallel to the third optical axis;
   a rotating device that rotates said first optical member about the second optical axis, the rotating device being driven by a motor of which a rotation axis thereof is parallel with the third optical axis; and
   wherein the image pickup element is fixed regardless of the rotation of said first optical member.

7. A tilting device as claimed in claim 6, comprising a base plate that holds said second optical member, and wherein said first optical member is supported on said base plate in a manner rotatable about the second optical axis.

8. A tilting device as claimed in claim 6, wherein at least one of said first optical member and said second optical member is formed by an optical prism.

9. A tilting device as claimed in claim 6, wherein at least one of said first optical member and said second optical member is formed by an optical reflective mirror.

10. An imaging apparatus comprising:
    a holding member including a drive structure;
    a first optical member that has a first optical axis and bends light incident thereon along the first optical axis in a direction of a second optical axis different from the first optical axis, wherein the first optical member being held by the holding member;
    a base plate located adjacent to the holding member, wherein the holding member is rotatably supported by the base plate;
    a second optical member that is disposed coaxially with the second optical axis and bends the light incident thereon along the second optical axis in a direction of a third optical axis different from the second optical axis, wherein the second optical member is held by the base plate;
    a plurality of lenses, wherein all of the lenses of the imaging apparatus are disposed entirely coaxially with the third optical axis for passing the light bent by said second optical member to an image pickup element, the plurality of lenses being guided in the direction of the third optical axis by a guide bar parallel to the third optical axis;
    a rotating device that engages with the drive structure of the holding member and rotates said first optical member about the second optical axis, the rotating device being driven by a motor of which a rotation axis is parallel with the third optical axis;
    wherein the image pickup element receives the light having passed through the plurality of lenses and outputs an image signal and is fixed regardless of the rotation of said first optical member, the image pickup element being fixed regardless of the rotation of the first optical member.

11. An imaging apparatus as claimed in claim 10, wherein the drive structure comprises a pulley part and the motor is coupled to a gear train and a linkage coupled to the gear train and the pulley part.

12. An imaging apparatus as claimed in claim 10, wherein the linkage comprises a belt.

13. An imaging apparatus as claimed in claim 11, wherein the plurality of lenses include at least one fixed lens, at least one variable lens and at least one focusing lens.

14. An imaging apparatus as claimed in claim 13, wherein the fixed lens is held by the base plate, the variable lens is held by a first holding member that is moveable along the third optical axis, and the focusing lens is held by a second holding member that is moveable along the third optical axis.

* * * * *